United States Patent [19]
Okada et al.

[11] Patent Number: 5,258,613
[45] Date of Patent: Nov. 2, 1993

[54] APPARATUS FOR MOUNTING OPTICAL FIBER IN FERRULE

[75] Inventors: Kinjiro Okada; Hiromasa Shiraishi, both of Tokyo; Hirokazu Yokozawa, Nagano; Shinichi Takehana, Nagano; Norio Kobayashi, Nagano, all of Japan

[73] Assignee: Hirose Electric Co., Ltd., Tokyo, Japan

[21] Appl. No.: 968,326

[22] Filed: Oct. 29, 1992

[51] Int. Cl.$^5$ ............................................. H01J 5/16
[52] U.S. Cl. ............................ 250/227.11; 250/223 R; 356/73.1
[58] Field of Search ............... 250/227.11, 223 R, 563, 250/572; 356/73.1; 358/101, 107; 364/559-563, 579, 580

[56] References Cited
U.S. PATENT DOCUMENTS

| | | | |
|---|---|---|---|
| 4,652,123 | 3/1987 | Neumann | 356/73.1 |
| 4,674,834 | 6/1987 | Margolin | 356/73.1 |
| 4,815,811 | 3/1989 | Crosnier et al. | 356/73.1 |
| 5,177,354 | 1/1993 | Tomita et al. | 356/73.1 |
| 5,177,557 | 1/1993 | Yamane | 356/73.1 |

Primary Examiner—David C. Nelms
Assistant Examiner—Stephone B. Allen
Attorney, Agent, or Firm—Kanesaka & Takeuchi

[57] ABSTRACT

A machine for mounting a ferrule on an optical fiber cable which includes a plurality of function units (11-17) arranged in a line, including a control and display unit (11) and an inserting unit (16) for inserting an optical fiber into a ferrule which has been injected with an adhesive; a plurality of pellets (21-29) for holding a ferrule and an optical fiber cable and traveling along the function units for circulation; a memory divided into a plurality of areas; a presence detector (13) for feeding the memory in a corresponding area with a failure signal if a ferrule or an optical fiber cable is not present on a pellet (23); an adhesive detector (15) for feeding the memory in a corresponding area with a failure signal if a predetermined amount of adhesive has not been injected into a ferrule; a projection detector (17) for feeding the memory in a corresponding area with a failure signal if a predetermined length of optical fiber does not project from a ferrule after the optical fiber has been inserted through the ferrule such that all of said failure signals are displayed when the pallet returns to the control and display unit.

1 Claim, 4 Drawing Sheets

APPARATUS FOR MOUNTING OPTICAL FIBER IN FERRULE

BACKGROUND OF THE INVENTION

1. Field of the Invention

The present invention relates generally to apparatus for mounting optical fiber cables in ferrules and, more particularly, to such apparatus equipped with test functions.

2. Description of the Prior Art

In order to connect optical fiber cables to equipment or other optical fiber cables, it is necessary to attach ferrules to the ends of optical fiber cables. The outer sheaths of end portions of the optical fiber cables are removed to expose the optical fibers before the mounting. In order to assure connections between the ferrules and the optical fiber cables, adhesives are injected into the ferrules before the optical fiber cables are put into the ferrules. In addition, to prepare the end surfaces of the optical fiber cables for the connections, predetermined lengths of optical fibers are protruded from the ferrules and, after bent, ground to provide such end surfaces.

The operation of mounting optical fiber cables in ferrules has be carried out by hand. That is, the outer sheaths of optical fiber cables are removed with tools. The exposed optical fibers are held at the outer sheaths in clamps such that they protrude sideways. The end portions of the optical fiber cables are inserted carefully through ferrules into which adhesives have been injected. Whether predetermined lengths of the optical fibers have been protruded from the ferrules are determined by observation.

However, the efficiency of such manual operations are very low. In addition, the lengths of optical fibers inserted into the ferrules and the amounts of adhesives injected vary with the operators, resulting in the uneven products.

SUMMARY OF THE INVENTION

Accordingly, it is an object of the invention to provide apparatus for efficiently mounting an optical fiber cable in a ferrule, which is able to distinguish good products from defective ones.

According to the invention there is provided an machine for mounting a ferrule on an optical fiber cable which includes a plurality of function units arranged in a loop, including a control and display unit and an inserting unit for inserting an optical fiber into a ferrule which has been injected with an adhesive; a plurality of pellets for holding a ferrule and an optical fiber cable and circulated along the function units; a memory divided into a plurality of areas; a presence detector for feeding the memory in a corresponding area with a failure signal if a ferrule or an optical fiber cable is not present on a pellet; an adhesive detector for feeding the memory in a corresponding area with a failure signal if a predetermined amount of adhesive has not been injected into a ferrule; a projection detector for feeding the memory in a corresponding area with a failure signal if a predetermined length of optical fiber does not project from a ferrule after the optical fiber has been inserted through the ferrule such that all of said failure signals are displayed when the pallet returns to the control and display unit.

An optical fiber cable is held by a pallet. The pallet is transferred to the next unit where the optical fiber is inserted into a ferrule into which an adhesive has been injected. The presence detector detects whether a ferrule is present in a proper position on the pallet by means of an optical sensor, for example, and generates a failure signal if the result is negative. The injection detector detects whether a predetermined amount of adhesive has been injected into a ferrule by means of a pump, for example and generates a failure signal if the result is negative. The projection detector detects whether a predetermined length of optical fiber projects from the ferrule after insertion by means of an optical sensor, for example and generates a failure signal if the result is negative.

The above failure signals are stored in the memory. When a memory area is provided in each pallet, any of the failure signals is stored in the memory area of the corresponding pallet. When the pallet is returned to the control and display unit, the failure signals are displayed in the display unit so that the operator takes it out as a defect product and set the next optical fiber cable in the pallet. When the memory is provided in the machine proper, it is divided into areas of the same number as that of the units. As the pallet moves from unit to unit, the memory contents are transferred to the corresponding areas. When the pallet is returned to the control and display unit, the memory contents are displayed to indicate defective products.

The above and other objects, features, and advantages of the invention will be more apparent from the following description when taken in conjunction with the accompanying drawings.

DESCRIPTION OF THE PREFERRED EMBODIMENT

Figure 1:
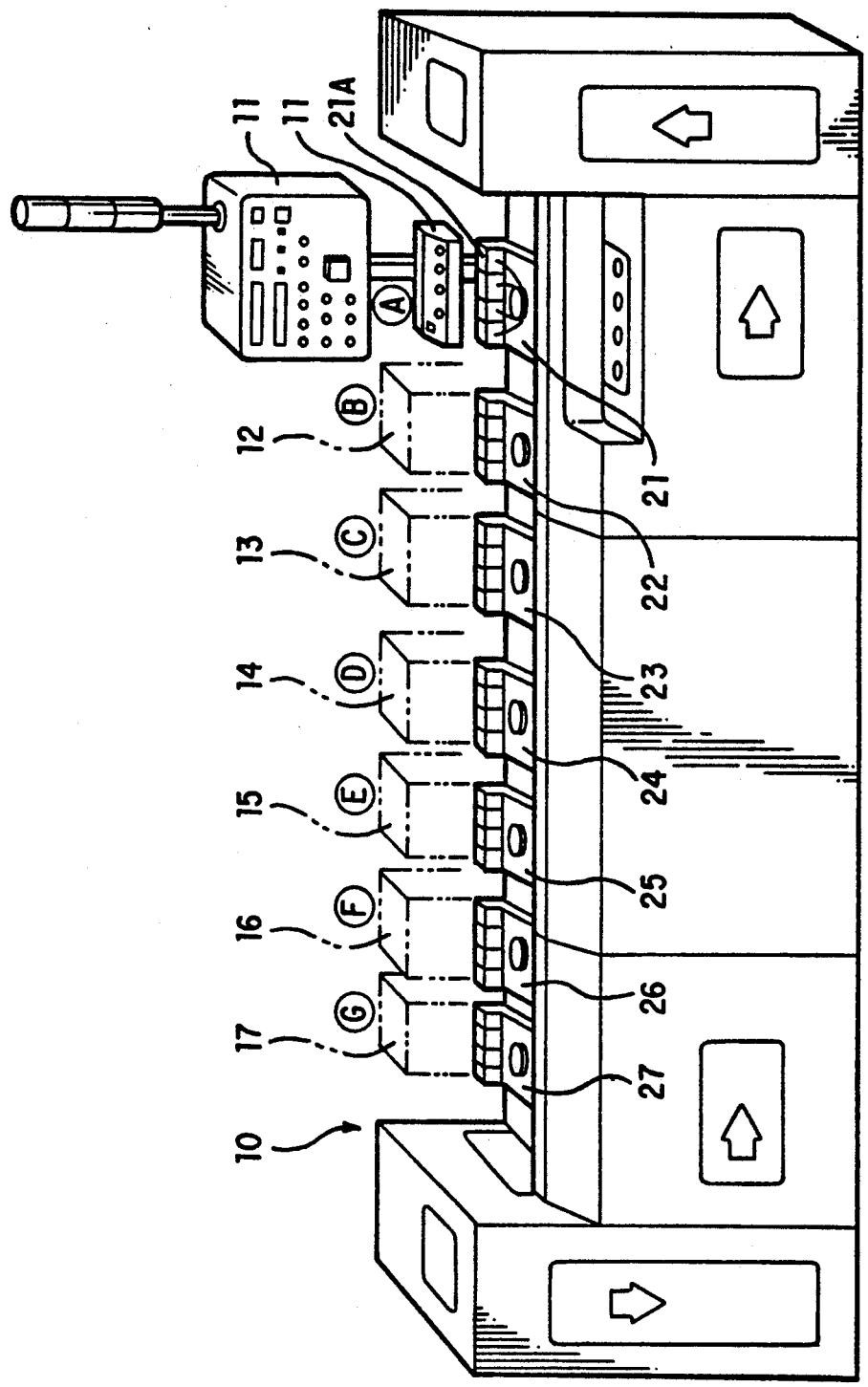
FIG. 1 is a perspective view of apparatus according to an embodiment of the invention.
Figure 2:
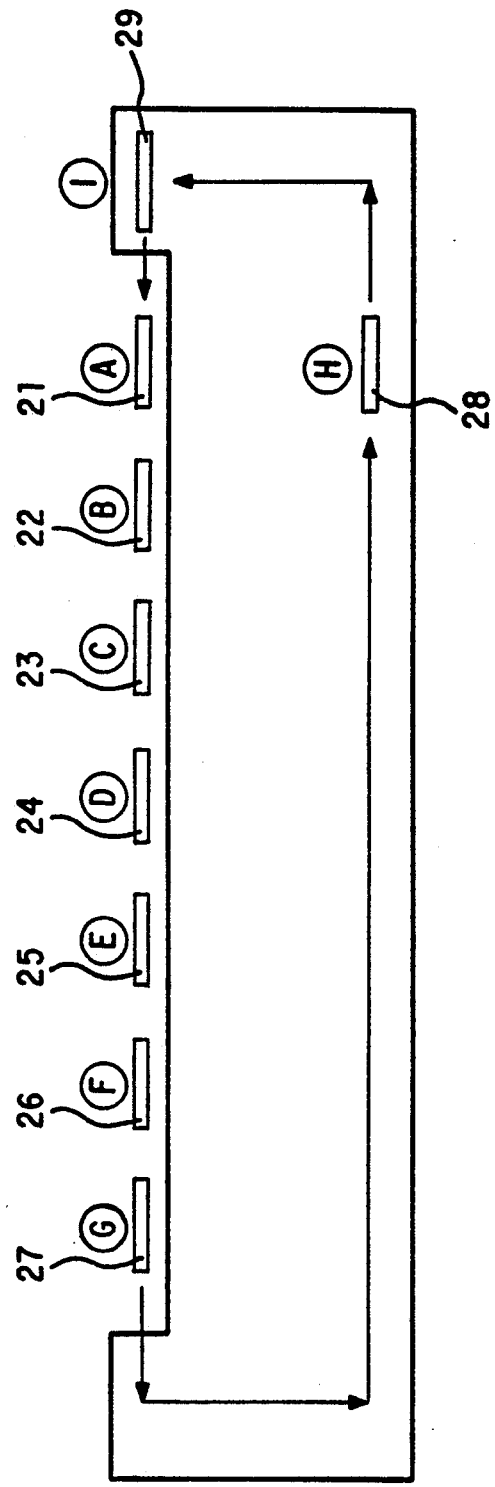
FIG. 2 is a longitudinal section of the apparatus showing the position of each station for pallets.

In FIGS. 1 and 2, a mounting apparatus 10 has seven stations A–G on the top and two stand-by stations H and I inside the housing for performing respective steps of mounting ferrules. The stations A–G each have a unit 11–17. The apparatus 10 is provided with pallets 21–29 of the same number as that of the stations A–I, or nine in this embodiment. These pallets 21–29 are circulated by chains, for example, so that they are intermittently stopped at the respective stations A–I.

The station A is provided with a control and display unit 11 for the operator to control the pallet in the station A. The control and display unit 11 also displays information about pallets in the other stations B–I. Each pallet 21 is provided with four cable holders 21A for holding four end portions of a pair of optical fiber cables such that the four end portions project toward the unit 11.

The unit 12 of the station B removes the outer sheaths of the optical fiber cables projected from the pallet 22. The unit 13 of the station C detects the presence of an optical fiber and provides a ferrule on the pallet. The unit 14 of the station D cleans the exposed optical fiber end portions. The unit 15 of the station E injects an adhesive into the ferrules on the pallet 25 by means of a pump, for example, and transfer the ferrules to the next station F. The unit 15 includes an injection detector for detecting the pressure of the pump to determine whether a predetermined amount of adhesive has been injected into the ferrule and a fiber detector for detecting whether the exposed optical fiber is present. The unit 16 of the station F inserts the ferrules over the optical fibers which are held by the pallet 26 such that the optical fibers project from the ferrule by a predetermined length. The unit 17 of the station G removes the excess adhesive from the ferrules and has a projection detector for detecting whether the predetermined length of the optical fiber has projected.

The above units and detectors themselves are conventional, and the description of detailed structures is omitted.

According to the invention there are provided two stand-by stations H and I within the apparatus 10 so that the pallets return to the station A via the station H and I. Inside the apparatus 10 there is provided also a memory (not shown) which is divided into areas of the same number as that of the stations such that a signal is stored in the station as the pallet is moved to the station.

Figure 3:
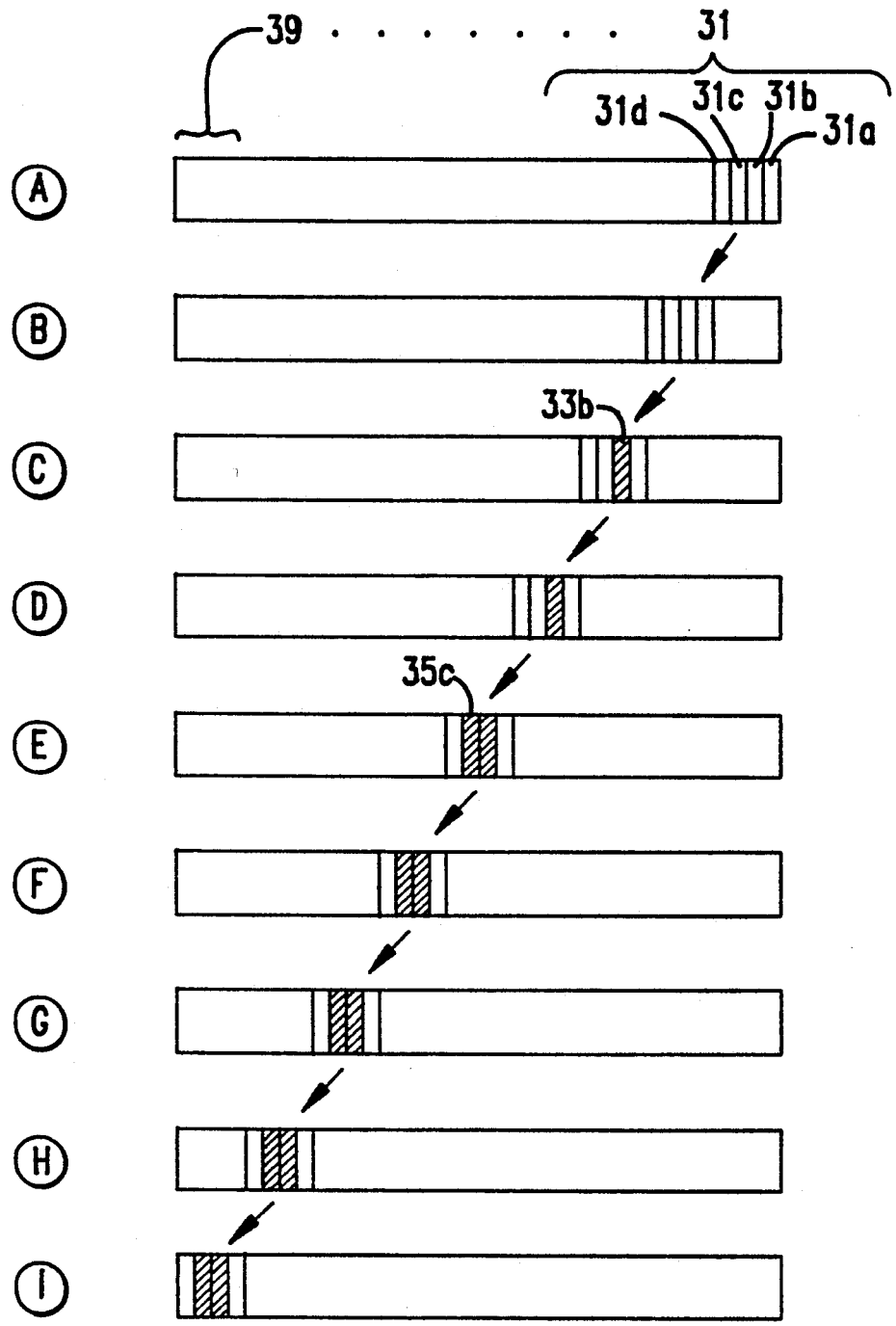
FIG. 3 is a diagram showing how Failure signals are generated in respective detectors.

In FIG. 3, the memory of each station is divided into nine areas 31-39. Since one pallet has four holders, one memory area 31 is divided into four subareas 31a-31d to store signals of four optical fibers with ferrules. The memory area for the pallet is moved to the next area 32 as the pallet is transferred to the next station B. In each station, a signal from each detector for the optical fiber is fed to the memory.

Figure 4:
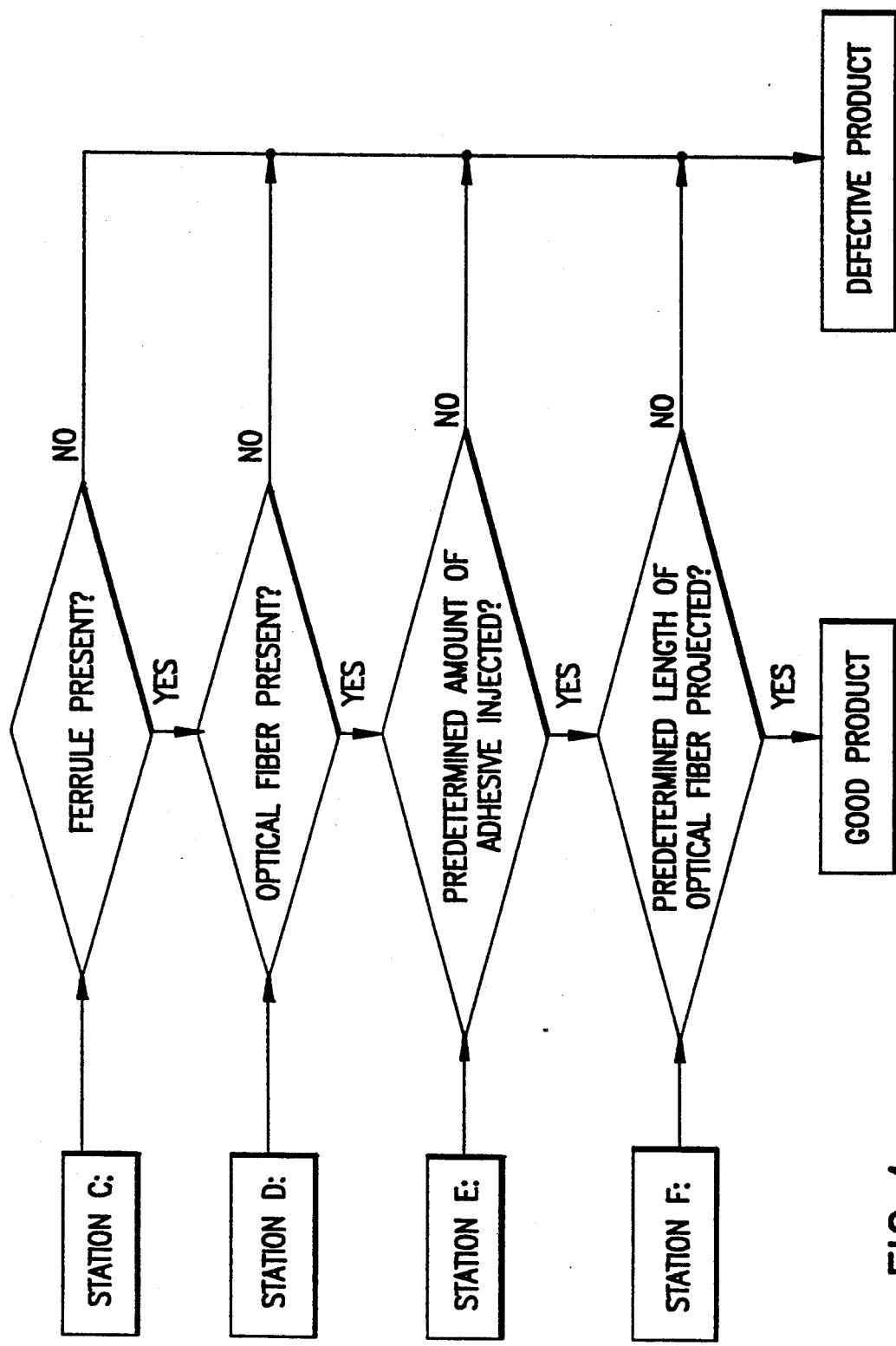
FIG. 4 is a flowchart showing how memories are transferred to respective stations for a pallet.

In FIGS. 3 and 4, when the present of a ferrule for the next optical fiber is not confirmed in the station C, a failure signal (hatched area) is fed to the memory area 33b. If the injection or projection detector issues a failure signal for the third optical fiber in the station E, it is added to the memory area 35c. Thus, the signals in the memory are transmitted to the memory areas 32-39 as the pallet is transferred to the stations. When the pallet returned to the first station A, the signals are displayed in the failure display of the unit 11. When the product is good, a pass signal may be displayed.

When the optical fiber to which the ferrule has been attached is taken out from the returned pallet, the operator looks at the display to see whether it is a good or defect product and then mount a new optical fiber.

Alternatively, each pallet may be provided with a memory rather than inside the apparatus. In this case, it is not necessary to divide the memory and move the memory contents. When the pallet is returned to the station A, the data is taken out of the memory and displayed.

We claim:

1. Apparatus for mounting a ferrule on an optical fiber cable, comprising:
   a plurality of function units arranged in a loop, including a control and display unit and an inserting unit for inserting an optical fiber into a ferrule which has been injected with an adhesive;
   a plurality of pellets for holding a ferrule and an optical fiber cable and circulated along said function units;
   a memory divided into a plurality of areas;
   a presence detector for feeding said memory in a corresponding area with a failure signal if a ferrule or an optical fiber cable is not present on a pellet;
   an adhesive detector for feeding said memory in a corresponding area with a failure signal if a predetermined amount of adhesive has not been injected into a ferrule;
   a projection detector for feeding said memory in a corresponding area with a failure signal if a predetermined length of optical fiber does not project from a ferrule after said optical fiber has been inserted through said ferrule such that all of said failure signals are displayed when said pallet returns to said control and display unit.

* * * * *